Patented Oct. 17, 1922.

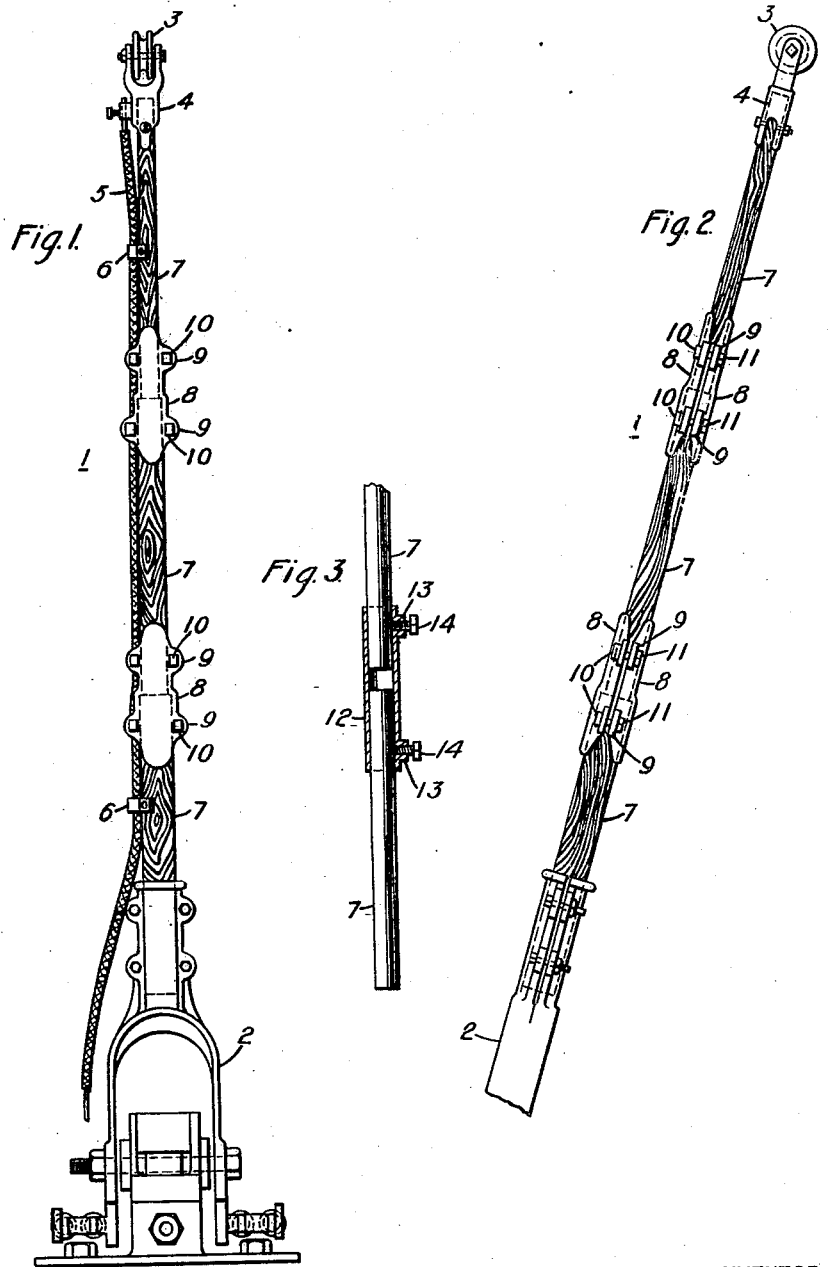

1,431,984

UNITED STATES PATENT OFFICE.

WILLIAM SCHAAKE, OF PITTSBURGH, PENNSYLVANIA, ASSIGNOR TO WESTINGHOUSE ELECTRIC & MANUFACTURING COMPANY, A CORPORATION OF PENNSYLVANIA.

TROLLEY POLE.

Application filed November 25, 1918. Serial No. 264,087.

*To all whom it may concern:*

Be it known that I, WILLIAM SCHAAKE, a citizen of the United States, and a resident of Pittsburgh, in the county of Allegheny and State of Pennsylvania, have invented a new and useful Improvement in Trolley Poles, of which the following is a specification.

My invention relates to trolleys and particularly to trolley poles.

One object of my invention is to provide a trolley pole that shall be so constructed of a plurality of longitudinal sections or members as to permit ready replacement of a damaged member, thereby effecting economy of time, labor and material.

Another object of my invention is to provide a sectional trolley pole the sections of which shall be individually adjustable longitudinally and rotatively, as may be found desirable.

It has been usual to construct trolley poles of a single piece of metal tubing, and damage thereto has sometimes resulted in the loss of the whole pole or at least has necessitated the removal of the pole and its associated members from the vehicle, on which it is mounted, for repairs.

These poles have also been of certain specified or standard lengths and not adapted to be adjusted after assembly.

Further, conditions have sometimes arisen when suitable metal tubing has not been readily or economically obtainable, which conditions have caused expense and been detrimental, as to the matter of time, in supplying an emergency demand.

In practicing my invention, I provide a trolley pole comprising a plurality of sections, preferably of wood and embraced and held together, at the adjacent ends thereof, by metal members. This construction, in which the component members are relatively cheap and easy to construct, permits the pole to be quickly assembled from stock members, one or more of which may be readily replaced when damaged.

In addition to the saving of time, labor and material thus effected, a trolley pole so constructed permits of ready adjustment both in the direction of, and about, its axis.

Figure 1 of the accompanying drawings is an elevational view of a trolley pole constructed in accordance with my invention; Fig. 2 is a similar view taken at right angles to Fig. 1; and Fig. 3 is a detail view, partially in section, of a modified form of trolley pole embodying my invention.

A trolley pole 1, attached to a usual base member 2, comprises a wheel 3, a harp 4, a conductor 5, that is supported on the pole 1 by clips 6, and a plurality of substantially cylindrical sections 7, preferably of wood, but permissively of metal or any other suitable material, which are joined together at their adjacent ends by complemental metal members 8. The members 8 embrace the sections 7 for some distance on each side of the adjacent ends thereof, and have apertured lugs 9 to receive bolts 10. Nuts 11 cooperate with the bolts 10 to clamp the adjacent sections 7 together and to permit adjustment of them longitudinally or rotatively with respect to each other and to the members 8. In Fig. 3, a hollow member 12 having hollow interiorly threaded lugs 13, for the reception of set screws 14, takes the place of the complemental members 8, in Figs. 1 and 2.

The inner faces of the members 8 and 12 conform to the sections 7 which may be of different diameters, as shown in Figs. 1 and 2, or of the same diameter, as shown in Fig. 3.

While I have shown and described particular forms of my invention, changes may be effected therein, without departing from the spirit and scope thereof, as set forth in the appended claims.

I claim as my invention:

1. A rigid trolley pole comprising a plurality of longitudinal wood sections, a pair of complemental rigid metal members embracing the ends of adjacent sections, and means for securing said metal members together.

2. A rigid trolley pole comprising a plurality of longitudinally alined wood sections, a pair of complemental rigid metal members tightly embracing the ends of adjacent sections, and means external to said wood sections for securing said metal members together.

3. A trolley pole composed of a plurality of wooden sections in longitudinally-alined end-to-end relation and detachable means for rigidly connecting the adjacent ends of said sections.

4. A trolley pole composed of a plurality of wooden sections in longitudinally-alined end-to-end relation and detachable means for rigidly connecting the adjacent ends of said sections, the successive wooden sections being of decreased cross sectional area toward the outer end of the pole.

In testimony whereof, I have hereunto subscribed my name this 20th day of Nov. 1918.

WILLIAM SCHAAKE.